G. H. RUSSELL.
Clothes Pounder.
No. 231,731. Patented Aug. 31, 1880.
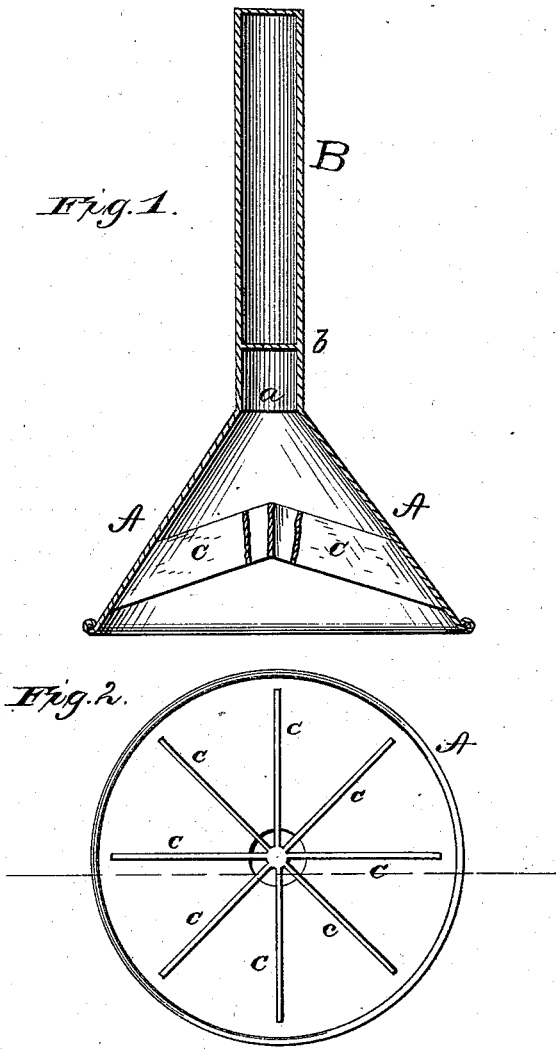

UNITED STATES PATENT OFFICE.

GEORGE H. RUSSELL, OF NEWBURG, PENNSYLVANIA.

CLOTHES-POUNDER.

SPECIFICATION forming part of Letters Patent No. 231,731, dated August 31, 1880.

Application filed October 11, 1879.

*To all whom it may concern:*

Be it known that I, GEORGE H. RUSSELL, of Newburg, in the county of Cumberland and State of Pennsylvania, have invented certain new and useful Improvements in Clothes-Pounders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates more particularly to that class of clothes-pounders having a hollow cone provided with a series of interior bars extending radially in downward inclination from the center of the cone to points located a little above its base.

In the drawings, Figure 1 is a vertical sectional view of the invention. Fig. 2 is a bottom-plan view of the same.

The hollow cone A is provided with a series of plate-bars, c, located with their width in vertical plane within the cone. The inner extremities of the plate-bars are soldered together at the center of the cone, and are maintained in position solely by mutual end bracing. These plate-bars extend radially from their point of projection in downward inclination to points located a little above the base of the cone.

The tubular tin handle B terminates at and has its lower extremity soldered to the top of the cone, the annular wall of the tubular handle joining the wall of a corresponding opening, a, formed in the apex of the cone for this purpose. The handle is provided with a transverse partition, b, formed therein above its point of junction with the cone. This partition serves the double purpose of inclosing the main portion of the tubular handle from the hollow cone and also of bracing the handle against lateral strain.

Having fully described my invention, what I claim as new, and desire to secure by Letters Patent, is—

1. The combination, with the single hollow cone A and handle B, terminating at its apex, of bars c, having their inner extremities soldered together and supported solely by mutual end bracing, the cone being free from all interior construction excepting said arms, substantially as set forth.

2. The combination, with the single hollow cone A, having an open apex, and bars c, whose inner extremities are supported solely by mutual end bracing, of tubular tin handle B, terminating at and having its circular wall soldered to the open conical apex, said handle being provided with partition b, extending across its interior above its juncture with the cone, substantially as set forth.

In testimony that I claim the foregoing I have hereunto set my hand this 24th day of September, 1879.

GEORGE H. RUSSELL.

Witnesses:
DANIEL W. STROPER,
JOSEPH A. CLIPPINGER.